United States Patent [19]
Stalgren et al.

[11] Patent Number: 6,030,009
[45] Date of Patent: Feb. 29, 2000

[54] DETACHABLE LATCH MECHANISM FOR BREAK-AWAY COMPONENTS

[75] Inventors: Stefan N. A. Stalgren, Cary, N.C.; Bradley T. Philippi, Bristol, Tenn.

[73] Assignee: Ericcson Inc., Research Triangle Park, N.C.

[21] Appl. No.: 09/134,050

[22] Filed: Aug. 14, 1998

[51] Int. Cl.[7] ........................................ E05C 7/00
[52] U.S. Cl. .................................. 292/27; 292/24
[58] Field of Search .................. 292/8, 10, 19, 292/27, 24, 34, 37, 40, 49; 379/59, 440; 455/97, 100

[56] References Cited

U.S. PATENT DOCUMENTS

| | | | |
|---|---|---|---|
| 928,905 | 7/1909 | Cottrell . | |
| 1,368,141 | 2/1921 | Hagstrom | 292/34 |
| 3,289,085 | 11/1966 | Leland | 292/19 |
| 4,535,870 | 8/1985 | Lindsay | 292/19 |
| 5,251,329 | 10/1993 | Takagi | 455/89 |
| 5,688,000 | 11/1997 | Dolman | 292/34 |
| 5,697,654 | 12/1997 | MacDonald | 292/40 |
| 5,706,332 | 1/1998 | Nagai | 379/58 |
| 5,950,116 | 9/1999 | Baro | 455/90 |

*Primary Examiner*—B. Dayoan
*Assistant Examiner*—Gary Estremsky
*Attorney, Agent, or Firm*—Jenkens & Gilchrist, P. C.

[57] ABSTRACT

Sliding latches are disposed on the mounting plate of an accessory to a base member. The sliding latches are biased towards respective extended positions at which the latches engage undercuts provided in an exterior surface of the base member. The sliding latches are also biased towards their engagement in the undercuts with a force sufficient to maintain such engagement until a predetermined force is applied to either the base member or the accessory, whereupon the sliding latches move toward a retracted position and the accessory separates from the base member. The sliding latches are interconnected by cam members rotatably mounted on the mounting plate, with at least one of the cam members being directly biased toward rotation in a direction which urges the sliding latches toward their respective extended positions.

7 Claims, 5 Drawing Sheets

DETACHABLE LATCH MECHANISM FOR BREAK-AWAY COMPONENTS

BACKGROUND OF THE INVENTION

Technical Field

This invention relates generally to a latch mechanism for detachably connecting a component to a body, and more particularly to such a latch mechanism that permits the component to break away from the body upon application of a predetermined force to either the component or the body.

History of Related Art

Heretofore, if a portable instrument was dropped, severe damage or breakage could occur to the body of the instrument and to any ancillary components fixedly attached to the body. For example, a portable cellular telephone, or radio telephone components of a satellite communication system, are typically hand carried and oftentimes prone to inadvertent dropping or falling onto a hard surface. When such accidents occurred, damage to the housing or internal components of the body or accessory frequently occurred. More recently, telecommunication systems using direct satellite linkages require an antenna that is larger than those used in earth-based cellular systems. If the satellite system transceiver is dropped, damage to the transceiver, antenna, or other components may easily occur.

The present invention is directed to overcoming the problem set forth above. It is desirable to have a latch arrangement whereby an accessory component can be detachably connected to a body, so that if the body and attached accessory component were dropped, the impact force can be distributed between the accessory component and the body. More specifically, it is desirable to have such a latch mechanism that permits the accessory component to separate from the body instrument if the impact force exceeds a predetermined value. It is also desirable to have such a latch system whereby the accessory component can be readily separated from the body in simple response to manually applying a predetermined force sufficient to separate but not damage the components, and the accessory component can be separately serviced or interchanged.

SUMMARY OF THE INVENTION

In one aspect of the present invention, a latching mechanism for detachably connecting an accessory to a base member which has predefined notches, or undercuts, formed therein, includes a mounting plate attached to the accessory, and three latches slidably disposed on the mounting plate. Each of the latches are moveable between an extended position whereat the respective latches engage a corresponding undercut defined in the base member. The latching mechanism further includes a pair of cam members rotatably mounted on the mounting plate and operatively connected to the latches slidably disposed on the mounting plate. The latches are respectively moved toward their respective extended and retracted positions in response to rotating a cam member to which the tab is operatively connected. The latching mechanism embodying the present invention also includes the means for biasing the cam members toward rotation in respective directions which move the interconnected latches to their respective extended positions.

Other features of the latching mechanism embodying the present invention includes the means for biasing the cam members being a spring element having a first portion fixedly supported in the accessory and a moveable second portion attached to a preselected one of the cam members. Other features include the pair of cam members being operatively connected together by a pair of pins provided on one of the latches, and the means for biasing the cam members being arranged to apply a bias force to a predetermined one of the cam members, with the bias force having a value sufficient to rotate the cam members in respective first directions, and then maintain the cam members at a fixed position whereat the three latches operatively connected to the pair of cam members are at respective extended positions. Still other features include the three latches being moved to respective retracted positions and said accessory being detached from the base member in response to applying a predetermined force to either the accessory or the base member.

In another aspect of the present invention, the latching mechanism for detachably mounting an antenna housing on a radio transceiver having predefined undercuts defined in an external surface thereof, includes a mounting plate attachable to the antenna housing and three latches slidably disposed on the mounting plate. Each of the latches are moveable on the mounting plate between an extended position whereat the respective latch engages a respective undercut defined in the external surface of the transceiver, and a retracted position. The latching mechanism further includes a pair of cam members rotatably mounted on the housing with each member of the pair being operatively connected to two latches. The latching mechanism further includes a means for biasing the cam members toward rotation in a predetermined direction.

Other features of the latching mechanism for detachably mounting an antenna housing on a radio transceiver includes the means for biasing the cam members toward rotation in the predefined directions providing a bias force having a value of about 30N whereby the three latches move to their respective retracted positions and the antenna housing detaches from the radio transceiver in response to applying a combined force load of about 30N to the latches.

BRIEF DESCRIPTION OF THE DRAWINGS

A more complete understanding and of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

In the preferred embodiment of the present invention, a latching mechanism 10 for detachably connecting an accessory to a base member is exemplified in the following description and the drawings in association with a radio transceiver 12 and an antenna housing 14 that is detachably mounted onto the radio transceiver 12. In the illustrated embodiment, the antenna housing 14 is two radome halves mated together for use with radio transceivers. The present invention is also applicable to other instruments used in direct satellite linkage systems where signals are both transmitted and received through the antenna by way of satellite relay. Consequently, the radome halves contained within the housing 14 in the illustrated embodiment are significantly larger than the single flip-up or extendable antenna used on conventional cellular telephones. However, the latching mechanism 10 is equally useful for detachably mounting an antenna or other accessory to a portable telecommunication instrument and, more broadly, to detachably connect accessory components to portable bodies.

Figure 1:
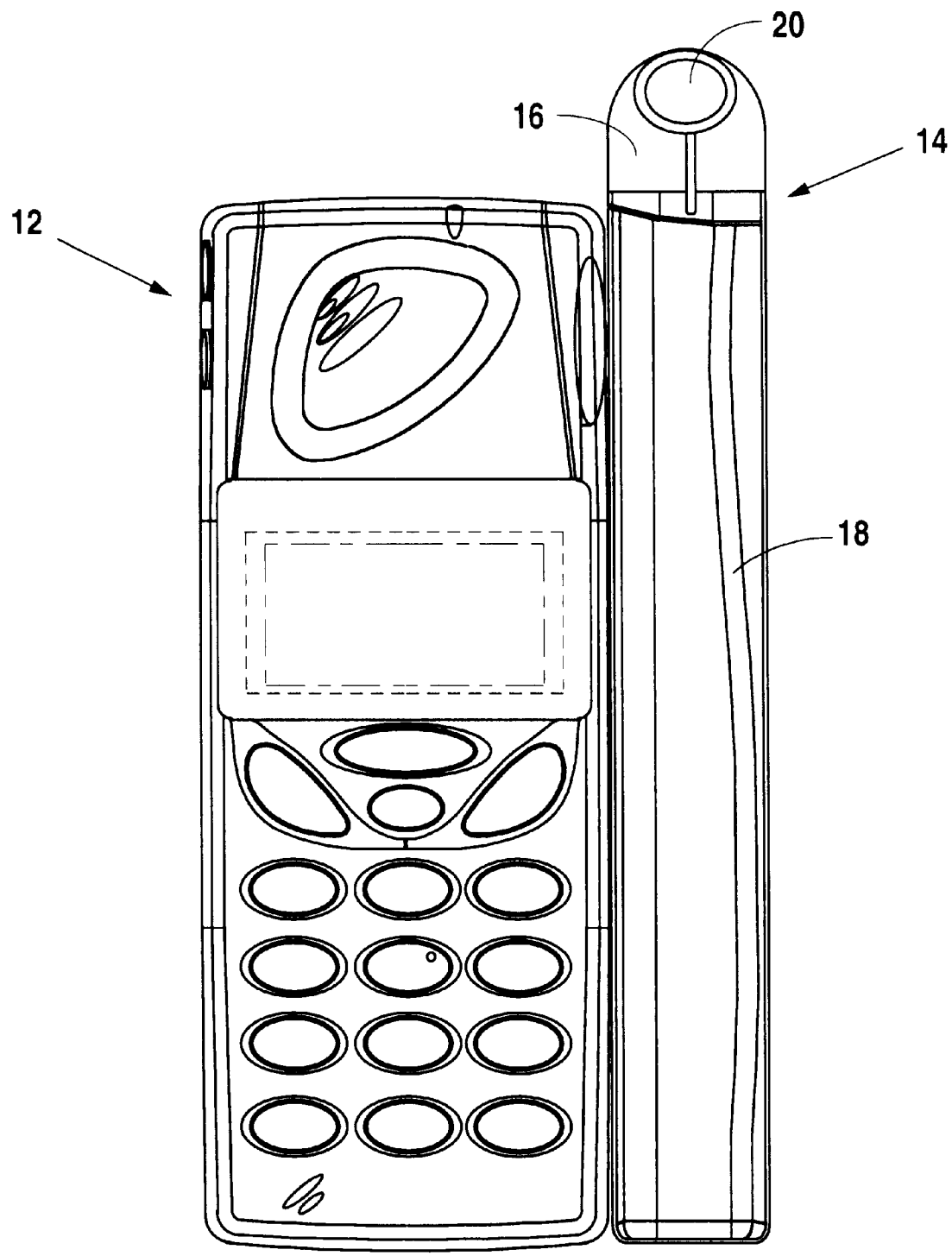
FIG. 1 is a front view of a radio transceiver having an antenna detachably mounted thereto by the latching mechanism embodying the present invention.

In the illustrated embodiment, the receiving and transmitting antenna system is enclosed within the antenna housing 14 which has a first portion 16 that is detachably attached, by way of the latching mechanism 10, to an upper rear portion of the radio transceiver 12. A second portion 18 of the antenna housing is pivotally attached to the first portion of the housing 16 by way of pivot joint 20. The active receiving and transmitting elements of the antenna are housed in the second portion 18 of the antenna housing 14. The pivot joint 20 permits the second portion 18 of the antenna housing to be moved from a stored position adjacent the radio transceiver when not in use, as shown in FIG. 1, and rotated 180° to an active position during use.

Figure 2:
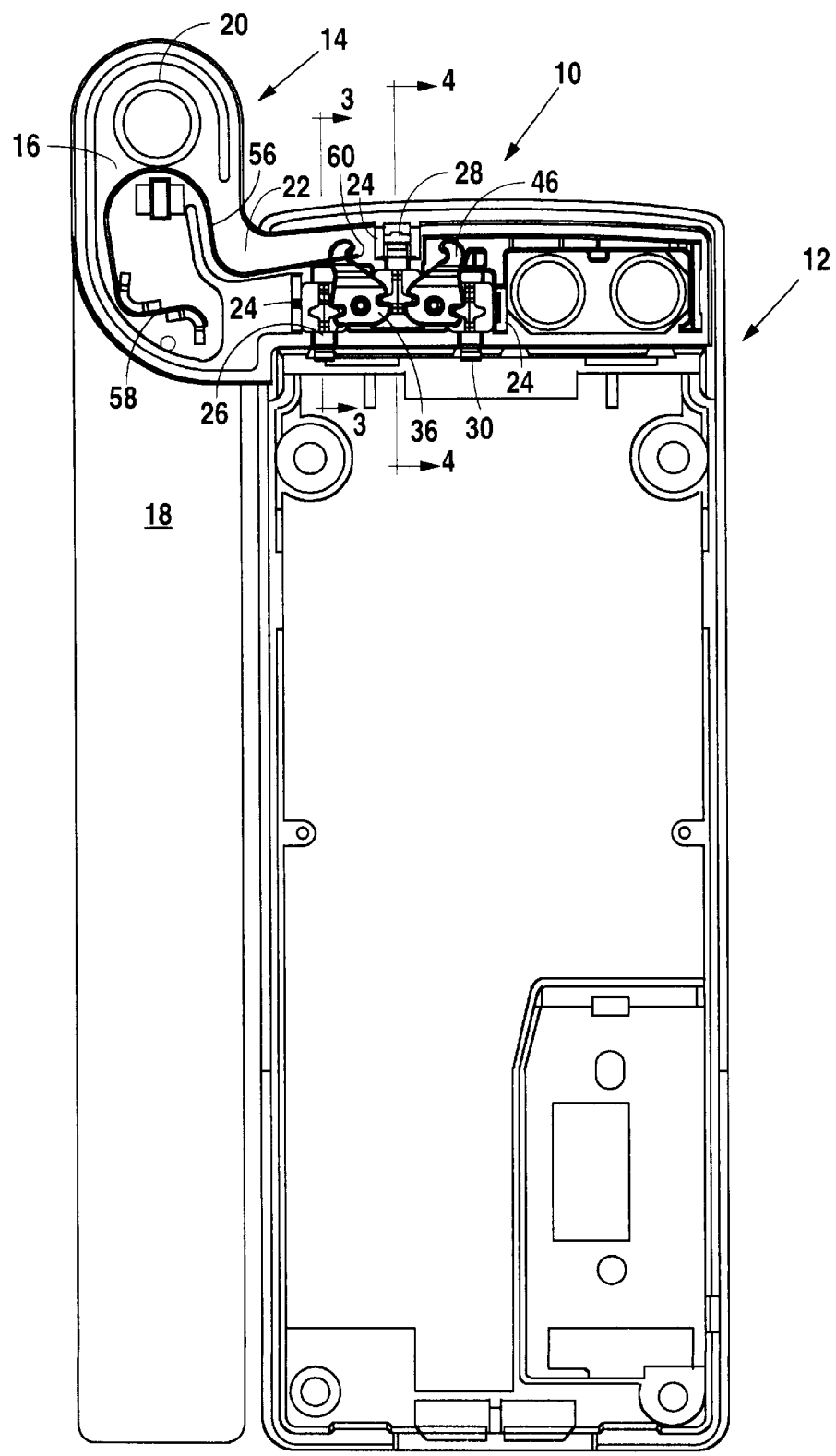
FIG. 2 is a rear view of the radio transceiver and detachable antenna accessory assembly shown in FIG. 1, with the rear covers of the radio telephone and antenna accessory housings removed to better show details of the latch mechanism embodying the present invention.
Figure 3:
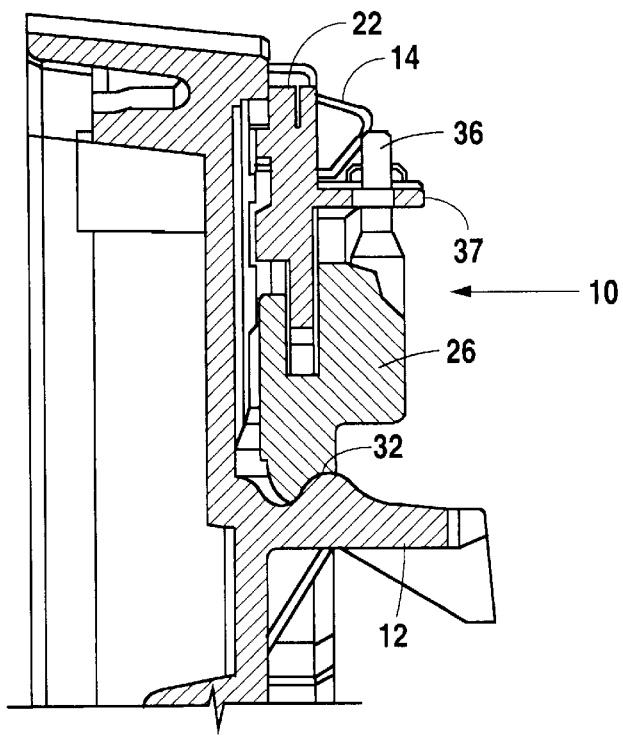
FIG. 3 is a cross-sectional view of the latch mechanism embodying the present invention, taken along the line 3—3 of FIG. 2.
Figure 4:
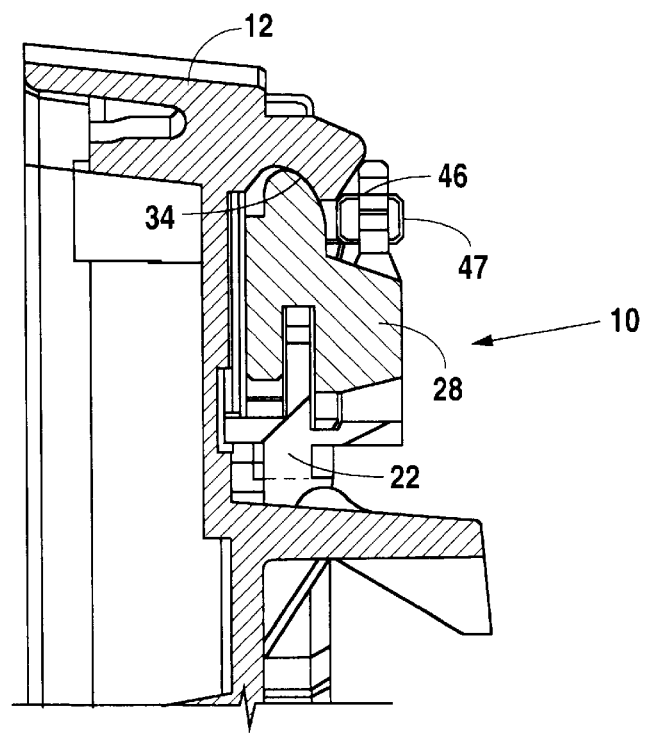
FIG. 4 is a cross-sectional view of the latch mechanism embodying the present invention, taken along the line 4—4 of FIG. 2.

The latching mechanism 10 embodying the present invention is shown in detail in FIGS. 2–6, and includes a mounting plate 22 that is attached to the antenna housing 14. The mounting plate 22 has a plurality of guides 24 formed thereon that are adapted to receive, respectively, a first latch 26, a second latch 28, and a third latch 30. Each of the latches 26, 28, 30 are respectively disposed within one of the guides 24 and are moveable within the respective guide 24 between an extended position and a retracted position. At the respective extended positions, the first latch 26 and third latch 30 extend downwardly and the second latch 28 extends upwardly to respectively engage a corresponding one of the notches, or undercut areas, formed in the external surface of the radio transceiver. For example, a first undercut 32, adapted to receive the first latch 26, is shown in section in FIG. 3, and a second undercut 34, adapted to receive the second latch 28, is shown in FIG. 4. A third undercut, not visible in either FIG. 3 or FIG. 4 is spaced to the right of the first and second undercuts 32, 34 and positioned elevationally even with the first undercut 32, and is adapted to receive the third latch 30.

Figure 5:
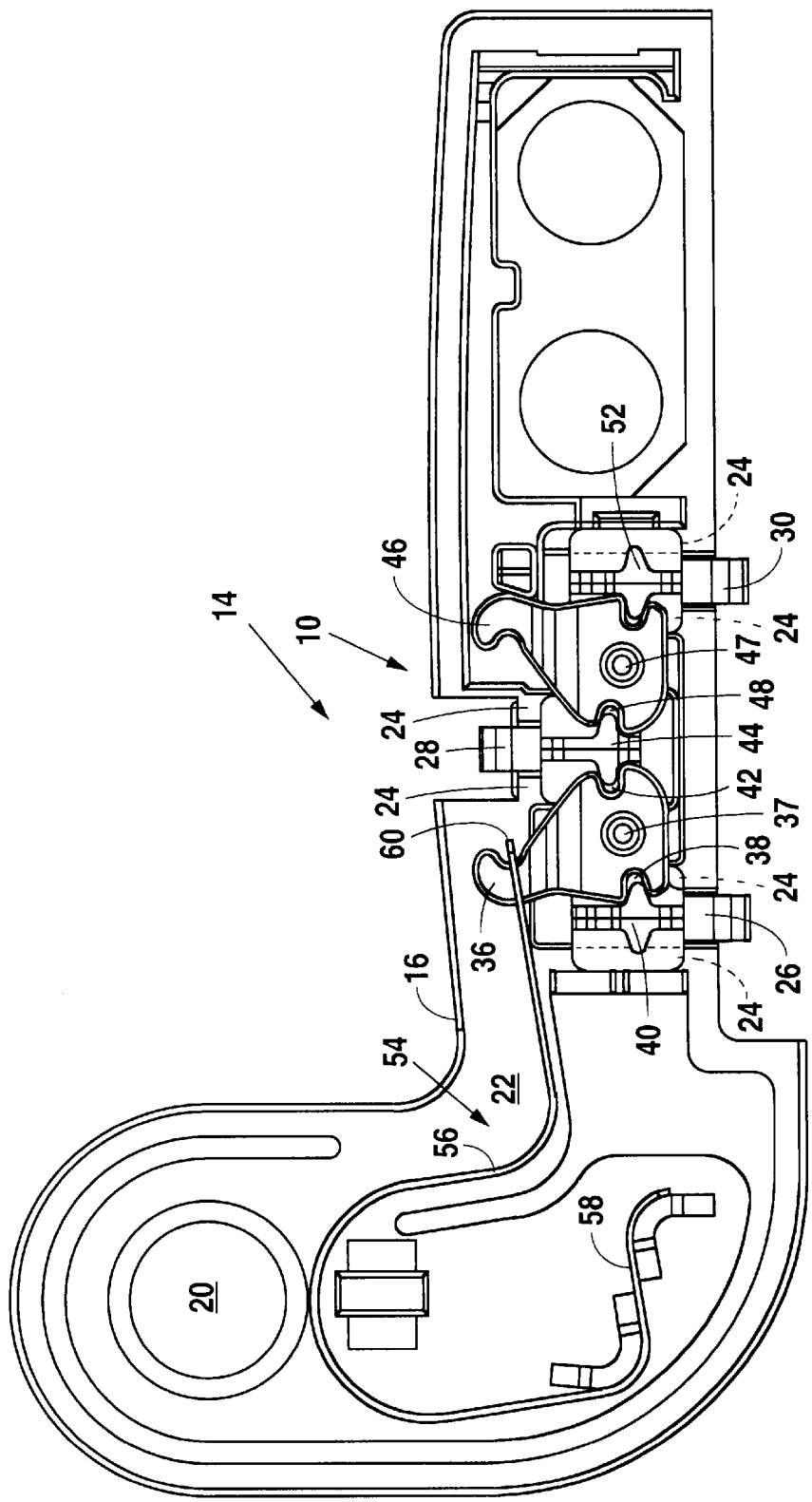
FIG. 5 is a rear view of the latch mechanism embodying the present invention, with the rear cover of the antenna housing removed to show details of the latching mechanism.
Figure 6:
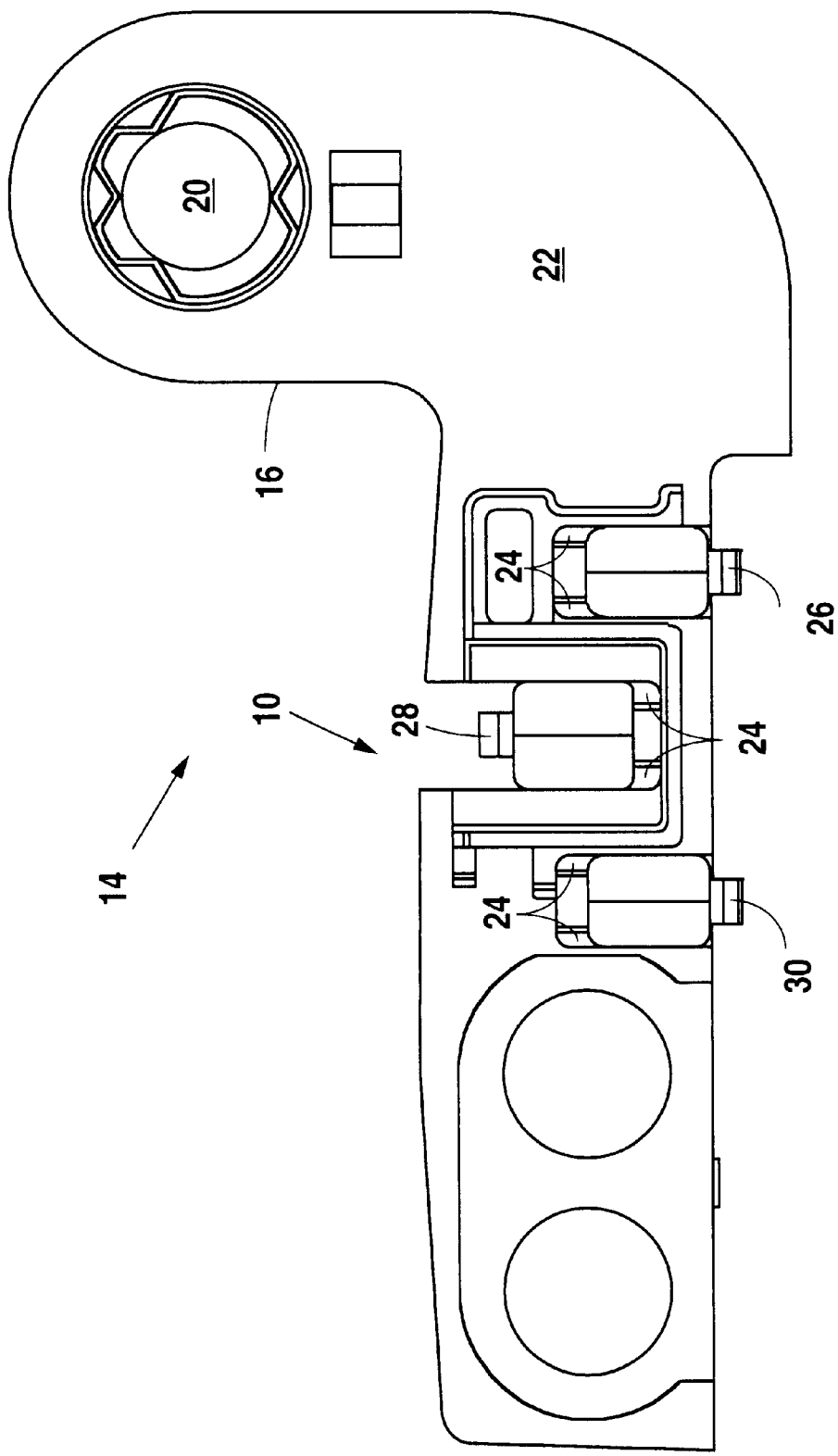
FIG. 6 is a front view of a latching mechanism embodying the present invention.

As shown in FIG. 2, and better shown in FIG. 5, the latching mechanism 10 includes a first cam member 36 rotatably mounted, by way of a pivot connection 37, on the mounting plate 22. The first cam member 36 has a first undercut 38 adapted to receive a lobed pin 40 extending outwardly from the first latch 26. The first cam member 36 also has a second undercut 42 adapted to slidably receive a portion of a lobed pin 44 extending outwardly from the second latch 28. Thus, the first latch 26 is moved downwardly to its extended position in response to rotating the first cam member 36 in a first, or counterclockwise, direction and is moved upwardly, towards a retracted position, when the first cam member 36 is rotated in a second, or clockwise, direction. In a similar manner, the second latch 28 is moved upwardly to its extended position in response to rotating the first cam member 36 in its first, or counterclockwise, direction and retracted in response to rotating the first cam member 36 in a clockwise direction.

The latching mechanism 10, further includes a second cam member 46 rotatably mounted, by way of a pivot connection 47, on the mounting pole 22. The second cam member 46 has a first undercut 48 adapted to receive a portion of the lobed pin 44 attached to the second latch 28, and a second undercut 50 adapted to receive a lobed pin 52 extending outwardly from the third latch 30. Thus, the lobed pin 44, extending outwardly from the second latch 28 serves a dual purpose. When the first cam member 36 is rotated, a portion of the lobed pin 44 received within the undercut 42 of the first cam member 36 acts as a follower, and moves the second latch 34, as described above, in accordance with the rotational direction of the first cam member 36. A second portion of the lobed pin 44, received within the first undercut 48 of the second cam member 46, acts as a drive pin, and rotates the second cam member 46 in accordance with the movement of the second latch 28. Thus, movement of the second latch 28 in an upward, or extended position causes the second cam member 46 to rotate about its pivot connection 47 in a first, or clockwise, direction, and thereby urges the third latch 30 downwardly toward its respective extended position. When the second latch 28 is moved downwardly, toward its retracted position, the second cam member 46 is rotated in a second, or counter-clockwise, direction and the third latch 30 is moved upwardly, as a result of engagement of the lobed pin 52 in the second undercut 50 of the second cam member 46, to its retracted position.

The latching mechanism 10 embodying the present invention also includes a means 54 for biasing the first cam member 36 and the second cam member 46 toward rotation in their respective first directions, i.e., the first cam member 36 in a counter-clockwise direction and the second cam member 46 in a clockwise direction. In the preferred embodiment, the means 54 for biasing the cam members 36, 46 in their respective first directions includes a stainless steel tension spring 56 having a fixed first end 58 attached to the antenna housing 14 and a moveable second end 60 attached to a portion of the first cam member 36. As described above, rotation of the first cam member 36, through the interconnection provided by the lobed pin 44, causes concurrent rotation, albeit in an opposite direction, of the second cam member 46. In other embodiments, the biasing means 54 may comprise other spring arrangements, such as coil springs, elastomeric elements, and the like.

The tension force provided by the biasing means 54 has a value sufficient to not only rotate the first cam member 36 in a counter-clockwise direction, and by way of the lobed pin 44 interconnection between the first cam member 36 and the second cam member 46, rotate the second member 46 in its respective first, or clockwise direction, but also maintain the interconnected first latch 26, the second latch 28, and the third latch 30 at their respective extended positions. The ends of the latches 26, 28, 30 have a taper which mates with a corresponding slope provided on the interior surface of the respective undercuts in the radio transceiver 12. If the radio transceiver 12 with the attached antenna housing 14 is dropped with sufficient force to cause potential damage to either one of the components, the resultant force transferred to the latching mechanism 10 will cause the tapered ends of the first, second and third latches 26, 28, 30 to slide out of engagement with their respective undercuts and retract from their mating positions within their respective undercuts in the radio transceiver housing, whereupon the antenna housing 14 becomes detached from the radio transceiver 12. In this manner, instead of transferring the force between the components of the structure, the components disengage and the potential damaging force transfer is avoided. More specifically, as a force is applied, sufficient to cause disengagement of the latches, 26, 28, 30 from their respective external undercuts in the radio transceiver 12, the latches 26, 28, 30 move toward their retracted position, causing the interconnected first and second cam members 36, 46 to rotate in their respective second directions against the bias force provided by the spring 56. In the illustrative embodiment described herein, the spring 56 provides a bias force of about 30N at the movable end 60 of the spring 56.

Thus, the latching mechanism 10, embodying the present invention mechanically attaches an integral accessory, such as an antenna housing 14 to a user terminal, such as a radio transceiver 12 at three separate points. The three points of mutual engagement between the accessory and the base are maintained in mutual abutting contact by a force applied in a perpendicular direction with respect to the mounting plate 22 on which the three latches 26, 28, 30 are slidably mounted. The three latches 26, 28, 30 are aligned by the guides 24 formed on the mounting plate 22, to assure proper lateral alignment of the latches with respect to the undercuts provided in the base member. As described above, with reference to the preferred embodiments of the present invention, if the unit 10 is dropped or shocked in a way such that a force of about 30N is transmitted to the latches 26, 28, 30, the latches will disengage from biased engagement with their respective undercuts, and the accessory will detach or break away from the body. This action is not only desirable to prevent the transmittal of damaging forces to the accessory if the unit is dropped or shocked, but also allows separation of the units if service or the replacement of the accessory is required.

Although the present invention is described in terms of a preferred exemplary embodiment, with a specific embodiment illustrating the application of a latching mechanism embodying the present invention to a radio transceiver and antenna housing unit, those skilled in the art will recognize that the latching mechanism 10 embodying the present invention is applicable to other structures having accessory components. Such changes are intended to fall within the scope of the following claims. Other aspects, features, and advantages of the present invention may be obtained from a study of this disclosure and the drawings, along with the appended claims.

What we claim is:

1. A latching mechanism detachably connecting an accessory to a base member having predefined undercuts defined therein, said latching mechanism comprising:

a mounting plate attachable to said accessory;

a first latch slidably disposed on said mounting plate, said first latch being moveable between an extended position whereat said first latch is engageable with a first one of the undercuts defined in said base member, and a retracted position;

a second latch slidably disposed on said mounting plate, said second latch being moveable between an extended position whereat said second latch is engageable with a second one of the undercuts defined in said base member, and a retracted position;

a third latch slidably disposed on said mounting plate, said third latch being moveable between an extended position whereat said third latch is engageable with a third one of the undercuts defined in said base member, and a retracted position;

a first cam member notably mounted on said mounting plate and operatively connected to said first latch and said second latch, said first and said second latches being moved toward their respective extended positions in response to rotating said first cam in a first direction and moved toward their respective retracted positions in response to rotating said first cam in a second direction;

a second cam member rotatably mounted on said mounting plate and operatively connected to said second latch and said third latch, said second cam member being rotated in a first direction in response to moving said second latch toward said extended position and in a second direction in response to moving said second latch toward said retracted position, said third latch being moved toward the respective extended position in response to said second cam member being rotated in said first direction and moved to the respective retracted position in response to rotating said second cam member in said second direction, said first and said second cam members being operatively connected together by a pin provided on said second latch; and a means for biasing said first and said second cam members toward rotation in their respective first directions by applying a bias force to a predetermined one of said first and said second cam members, said bias force having a value sufficient to rotate said first and said second cam members in the respective first directions and maintain said first and said second cam members at a fixed position whereat said first, second, and third latches operatively connected to said first and said second cam members are at their respective extended positions, and said first, said second and said third latches being moved to their respective retracted positions and said accessory is detached from said base member in response to applying a predetermined force to one of said accessory and said base members.

2. A latching mechanism, as set forth in claim 1, wherein said means for biasing said first and said second cam members toward rotation in their respective first directions includes a spring element having a first portion fixedly supported in said accessory and a moveable second portion attached to a preselected one of said first and said second cam members.

3. A latching mechanism, as set forth in claim 1, wherein said first direction in which the first cam member is rotated is a rotationally opposite direction to said first direction in which the second cam member is rotated.

4. A latching mechanism detachably connecting an accessory to a base member having a plurality of predefined undercuts formed therein, said latching mechanism comprising:

a mounting plate attachable to said accessory;

a first latch slidably disposed on said mounting plate, said first latch being moveable between an extended position whereat said first latch is engageable with a first one of the undercuts defined in said base member and a retracted position;

a second latch slidably disposed on said mounting plate, said second latch being moveable between an extended position whereat said second latch is engageable with a second one of the undercuts defined in said base member, and a retracted position;

a third latch slidably disposed on said mounting plate, said third latch being moveable between an extended position whereat said third latch is engageable with a third one of the undercuts defined in said base member, and a retracted position;

a first cam member rotatably mounted on said mounting plate and operatively connected to said first latch and to said second latch, said first and said second latches being moved toward their respective extended positions in response to rotating said first cam in a first direction and moved toward their respective retracted positions in response to rotating said first cam in a second direction;

a second cam member rotatably mounted on said mounting plate and operatively connected to said second latch and to said third latch, said second cam member being rotated in a first direction in response to moving said second latch toward said extended position and in a second direction in response to moving said second latch toward said retracted position, said third latch being moved toward the respective extended position in response to said second cam member being rotated in said first direction and moved to the respective retracted position in response to rotating said second cam member in said second direction;

a means for biasing said first and said second cam members toward rotation in their respective first direction; and each of said first, second, and third latches having a pair of undercuts adapted to receive at least a portion of one of said pins therein whereby two of said latches are operatively connected with each of said cam members, said undercuts being arcuately displaced in response to rotating the respective cam member in which the undercuts are disposed, and said first, said second, and said third latches being linearly displaced in response to rotating said cam member to which the respective latch is operatively connected.

5. A latching mechanism, as set forth in claim 4, wherein the pin on said second latch is arranged to engage one of said pair of undercuts on each of said first and said second cam members.

6. A latching mechanism detachably mounting an antenna housing on a radio transceiver having predefined undercuts defined in an external surface thereof, said latching mechanism comprising:

a mounting plate attachable to said antenna housing;

a first latch slidably disposed on said mounting plate, said first latch being moveable between an extended position whereat said first latch is engageable with a first one of the undercuts defined in said external surface of said transceiver, and a retracted position;

a second latch slidably disposed on said mounting plate, said second latch being moveable between an extended position whereat said second latch is engageable with a second one of the undercuts defined in said external surface of said transceiver, and a retracted position;

a third latch slidably disposed on said mounting plate, said third latch being moveable between an extended position whereat said third latch is engageable with a third one of the undercuts defined in said external surface of said transceiver, and a retracted position;

a first cam member rotatably mounted on said mounting plate and operatively connected to said first latch and said second latch, said first and said second latches being moved toward their respective extended positions in response to rotating said first cam in a first direction and moved toward their respective retracted positions in response to rotating said first cam in a second direction;

a second cam member rotatably mounted on said mounting plate and operatively connected to said second latch and said third latch, said second cam member being rotated in a first direction in response to moving said second latch toward said extended position and in a second direction in response to moving said second latch toward said retracted position, said third latch being moved toward the respective extended position in response to said second cam member being rotated in said first direction and moved to the respective retracted position in response to rotating said second cam member in said second direction;

said first and said second cam members being operatively connected together by a pin provided on said second latch; and a means for biasing said first and said second cam members toward rotation in their respective first directions by applying a bias force to a predetermined one of said first and said second cam members, said bias force having a value sufficient to rotate said first and said second cam members in their respective first directions and maintain said first and said second cam members at a fixed position whereat said first, said second, and said third latches operatively connected to said first and said second cam members are at their respective extended positions, and said first, said second, and said third latches moved to their respective retracted positions and said antenna detached from said radio transceiver in response to applying a predetermined force to one of said antenna housing and said radio transceiver.

7. A latching mechanism, as set forth in claim 6, wherein said first, said second, and said third latches are moved to their respective retracted positions and said antenna housing is detached from said radio transceiver in response to applying a combined force of about 30N to said first, said second, and said third latches.

* * * * *